(12) United States Patent
Okada et al.

(10) Patent No.: US 7,600,603 B2
(45) Date of Patent: Oct. 13, 2009

(54) STRUCTURE OF ATTACHING ELECTRIC POWER STEERING APPARATUS FOR VEHICLE

(75) Inventors: Megumu Okada, Saitama (JP); Keita Yagi, Saitama (JP); Kihoko Kaita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 398 days.

(21) Appl. No.: 11/391,552

(22) Filed: Mar. 29, 2006

(65) Prior Publication Data

US 2006/0219469 A1 Oct. 5, 2006

(30) Foreign Application Priority Data

Mar. 31, 2005 (JP) ............................. 2005-101142

(51) Int. Cl.
*B62D 3/00* (2006.01)
*B62D 5/04* (2006.01)
(52) U.S. Cl. .................. 180/444; 180/908; 280/93.513
(58) Field of Classification Search ................ 180/443, 180/444, 446, 908, 426, 439, 440; 280/93.513, 280/93.51, 771, 775
See application file for complete search history.

(56) References Cited

U.S. PATENT DOCUMENTS

| 6,966,399 | B2* | 11/2005 | Tanigaki et al. | 180/444 |
| 7,182,169 | B2* | 2/2007 | Suzuki | 180/426 |
| 2004/0099470 | A1* | 5/2004 | Tanigaki et al. | 180/443 |
| 2004/0168849 | A1* | 9/2004 | Honaga et al. | 180/444 |
| 2004/0178619 | A1* | 9/2004 | Takahashi | 280/779 |

FOREIGN PATENT DOCUMENTS

JP 2663454 B2 6/1997

* cited by examiner

*Primary Examiner*—Lesley D Morris
*Assistant Examiner*—Marc A Scharich
(74) *Attorney, Agent, or Firm*—Birch, Stewart, Kolasch & Birch, LLP

(57) ABSTRACT

A structure for attaching an electrically-operated power steering apparatus for a vehicle. The structure includes a body frame, more specifically, sub slant frames having respective motor brackets for supporting an actuator unit. The motor brackets have bolts that fasten the actuator unit, and the bolts extend perpendicularly to a steering shaft. With this configuration, the structure is not affected by a manufacturing error of a body frame and other parts of the vehicle. Further, the structure takes account of a direction in which fastening means is tightened.

18 Claims, 5 Drawing Sheets

STRUCTURE OF ATTACHING ELECTRIC POWER STEERING APPARATUS FOR VEHICLE

CROSS-REFERENCE TO RELATED APPLICATION

The present application claims priority under 35 U.S.C. §119 to Japanese Patent Application No. 2005-101142, filed Mar. 31, 2005, the entire contents of which are hereby incorporated by reference.

BACKGROUND OF THE INVENTION

1. Field of the Invention

The present invention relates to an improvement of a structure of attaching an electric power steering apparatus of a vehicle.

2. Description of Background Art

There is known a conventional structure of attaching an electric power steering apparatus for vehicles where a steering shaft is divided into an upper shaft and a lower shaft, an electrically-operated power steering apparatus is interposed between the upper and lower shafts, and an upper surface of the electrically-operated power steering apparatus is attached to a body frame of the automotive vehicle via a bracket (see Japan Patent No. 2663454

Japan Patent No. 2663454 will be described below.

As shown in FIG. 2 of Japan Patent No. 2663454, an upper portion 7a of a steering shaft 7 is supported by an upper frame pipe 101, and a lower portion 7b of the steering shaft 7 is supported by a lower frame pipe 102. An electrically-operated power steering apparatus 8 is interposed between the upper portion 7a and the lower portion 7b, and the electrically-operated power steering apparatus 8 is attached, with a bolt, to a bracket 9 disposed on the upper frame pipe 101.

The direction in which the bolt is tightened is identical with a direction in which the steering shaft 7 extends.

Although the electrically-operated power steering apparatus 8 is supported by the bracket 9 attached to the upper frame pipe 101, depending on a manufacturing error of the upper frame pipe 101 and the bracket 9, a clearance may be formed between the bracket 9 and an attaching surface of the electrically-operated power steering apparatus 8, or an attaching portion of the bracket 9 may be located below the attaching surface of the electrically-operated power steering apparatus 8, thereby making it difficult to attach the electrically-operated power steering apparatus 8 to the bracket 9. Further, when assisting a steering force, the electrically-operated power steering apparatus 8 receives a rotational force as generated at the steering shaft 7, at the bolt extending perpendicularly to the rotational direction of the steering shaft 7, and thus a shearing force occurs in the bolt. Thus, it is desired to change the direction of tightening of the bolt.

SUMMARY AND OBJECTS OF THE INVENTION

An object of the invention is to provide an structure of attaching an electrically-operated power steering apparatus for vehicles, which is not affected by a manufacturing error of a body frame and other parts of the vehicle, and which takes account of a direction of tightening of fastening means.

According to a first aspect of the present invention, a structure of attaching an electrically-operated power steering apparatus for a vehicle is provided, in which a steering shaft is rotatably attached to a body frame, and handlebars are attached to the upper portion of the steering shaft and an actuator unit is disposed on an intermediate portion of the steering shaft. The body frame has a support member which supports the actuator unit and has fastening means for fastening the actuator unit; and the fastening means extends perpendicularly to the steering shaft.

By having the fastening means and the steering shaft perpendicular to each other, even when the axis of the steering shaft and accordingly the actuator unit deviates in the transverse direction in assembling the steering shaft, the actuator unit can be reliably supported by the body frame, without enhancing the dimensional accuracy of the body frame, in other words, without affected by a manufacturing error of the body frame. On the fastening means, only a force in a direction of tension or compression acts.

According to a second aspect of the present invention, the actuator unit has, at a position corresponding to the support member, a fastening hole engaging with the fastening means; and the fastening means is a bolt extending through the support member and the fastening hole in the transverse direction of the vehicle.

Although the fastening means is provided in a simplified form, namely, the bolt, a force in the turning direction of the bolt is not exerted when the steering shaft rotates, since the direction in which the bolt is turned to be loosened and tightened and the rotational direction of the steering shaft differ from each other.

According to a third aspect of the present invention, the actuator unit has, at a position corresponding to the support member, the fastening hole engaging with the fastening means; and the fastening hole is located substantially at a center of gravity of the actuator unit in side view.

By fastening the fastening means to the fastening hole of the actuator to fasten the actuator unit to the support member, a force acting on the center of gravity of the actuator unit is efficiently received by the support member.

According to a fourth aspect of the present invention, the actuator unit has a motor housing covering the electric motor, a worm gear housing covering a worm gear that transmits rotation of the electric motor to the steering shaft, and a joint housing connecting the motor housing with the worm gear housing; and the fastening hole is formed in the joint housing.

With the joint housing supporting the electric motor as a heavy load, the electric motor is inhibited from rotating around the steering shaft with rotation of the steering shaft. The joint housing is a portion connecting the motor housing with the worm gear housing, and thus inside the joint housing extends only a connecting member that connects the electric motor and the worm gear. Hence, a wall in which the fastening hole is formed can be easily provided.

According to a fifth aspect of the present invention, a portion of the steering shaft below the actuator unit is supported by the body frame, and has a bearing support member that rotatably supports the steering shaft; and the bearing support member and the support member are disposed on the same part that constitutes the body frame.

By disposing the bearing support member and the support member on the same part constituting the body frame, the assembly accuracy among a plurality of support members that support the actuator unit is enhanced.

According to the first aspect of the present invention, the body frame has the support member which supports the actuator unit and has the fastening means for fastening the actuator unit, and the fastening means extends perpendicularly to the steering shaft. Hence, even when an axis of the steering shaft and accordingly the actuator unit deviates in the transverse direction in assembling the steering shaft, the actuator unit can be reliably supported by the body frame, without enhancing the dimensional accuracy of the body frame.

Further, since the direction of tightening of the bolt is substantially coincident with the direction of the rotational force generated at the actuator, the force generated at the bolt is only that in the direction of tension and compression and a shearing force does not occur. Hence, the life of the bolt is prolonged.

According to the second aspect of the present invention, the fastening means is the bolt extending through the support member and the fastening hole in the transverse direction of the vehicle. Therefore, although the fastening means is provided in the simple form of the bolt, since the direction in which the bolt is turned to be loosened and tightened and the rotational direction of the steering shaft differ from each other, a force in the turning direction of the bolt is not exerted when the steering shaft rotates. Hence, the bolt is maintained tightly fastened.

According to the third aspect of the present invention, the fastening hole is located substantially at the center of gravity of the actuator unit in side view, a force acting on the actuator unit can be efficiently received by the support member.

According to the fourth aspect of the present invention, the actuator unit has the motor housing, the worm gear housing, and the joint housing connecting the motor housing with the worm gear housing, and the fastening hole is formed in the joint housing. Hence, with the joint housing supporting the electric motor as a heavy load, the electric motor is inhibited from rotating around the steering shaft with rotation of the steering shaft. The joint housing is a portion connecting the motor housing with the worm gear housing, and thus inside the joint housing extends only a connecting member that connects the electric motor and the worm gear. Hence, a wall in which the fastening hole is formed can be easily provided.

According to the fifth aspect of the present invention, the portion of the steering shaft below the actuator unit has the bearing support member that rotatably supports the steering shaft, and the bearing support member and the support member are disposed on the same part that constitutes the body frame. Hence, the assembly accuracy among the plurality of support members that support the actuator unit can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
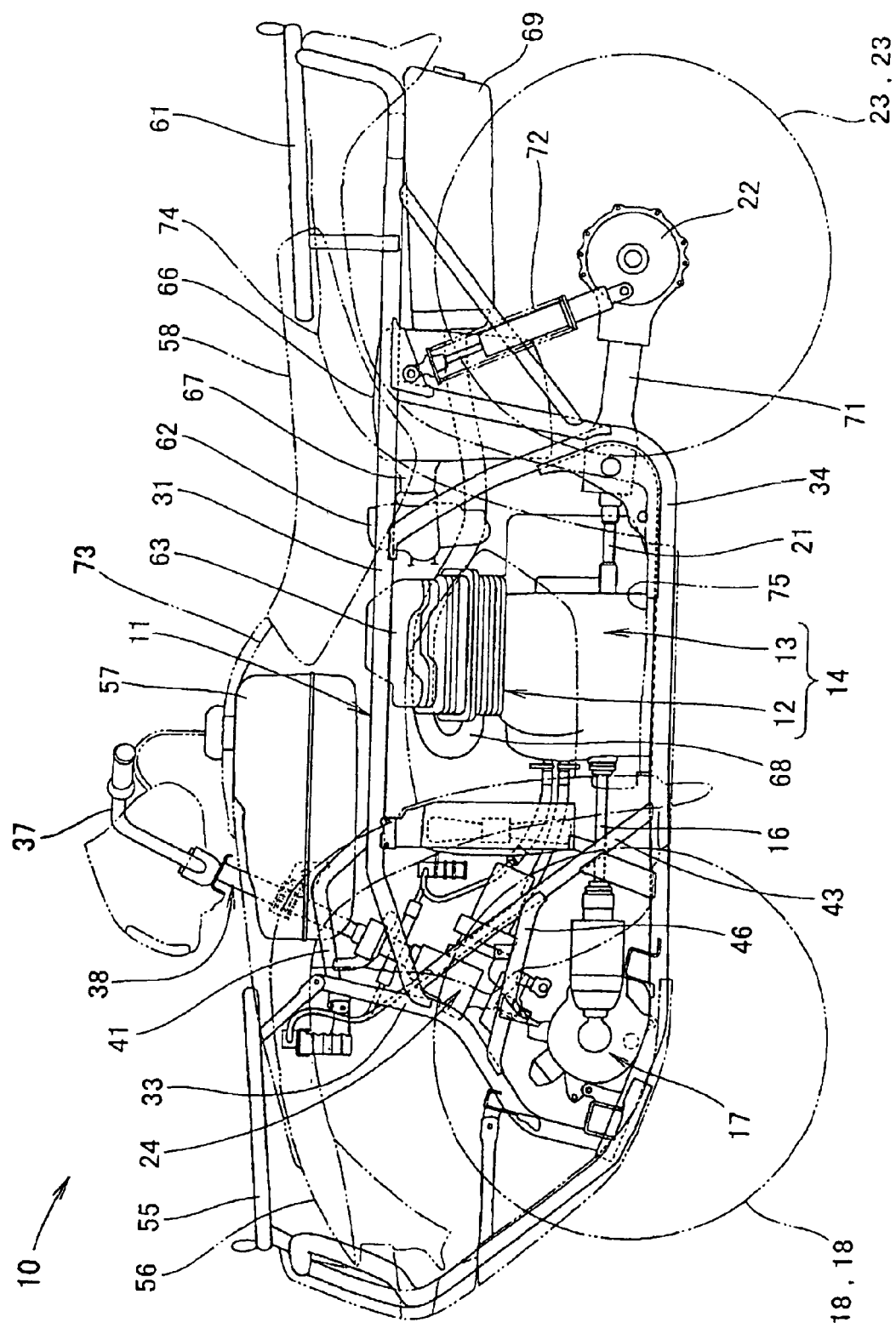
FIG. 1 is a side view of an all terrain vehicle equipped with an electrically-operated power steering apparatus according to the invention.

FIG. 1 is a side view of an all terrain vehicle including an electrically-operated power steering apparatus according to the invention. The all terrain vehicle 10 is a four-wheel drive vehicle in which a power unit 14 constituted by an engine 12 and a transmission 13 is mounted at a central portion of a body frame 11 of the all terrain vehicle 10. A front final reduction gear 17 is connected to a front portion of the transmission 13 via a front propeller shaft 16. A front left wheel 18 and a front right wheel 18 are connected to the front final reduction gear 17 via a drive shaft not shown. A rear final reduction gear 22 is connected to a rear portion of the transmission 13 via a rear propeller shaft 21, and a rear left wheel 23 and a rear right wheel 23 are connected to the rear final reduction gear 22 via a drive shaft not shown. The all terrain vehicle 10 is equipped with an electrically-operated power steering apparatus 24 that reduces a steering force by which the front wheels 18, 18 are steered.

The body frame 11 includes: a pair of left and right upper main frames 31, 32 (although only reference numeral 31 for the one on the shown side is presented) extending in a longitudinal direction of the vehicle; a front frame 33 which has an inverse U-shape as seen from the front side and to which a front end of each of the upper main frames 31, 32 is connected; and a pair of left and right lower main frames 34, 36 (although only reference numeral 34 for the one on the shown side is presented) connected to a lower end of the front frame 33 and each intermediate portion of the upper main frames 31, 32.

The body frame 11 also includes a pair of left and right front upper frames 41, 42 (although only reference numeral 41 on the shown side is presented) which are angled in a V-shape and connected to an upper end of the front frame 33 and the upper main frames 31, 32, so as to support an upper portion of the steering shaft 38, on an upper end of which a handlebars 37 is attached, such that the upper portion of the steering shaft 38 is rotatable; a pair of left and right slant frames 43, 44 (although only reference numeral 43 on the shown side is presented) extending rearward and downward from each front end of the upper main frames 31, 32 to be connected to the lower main frames 34, 36, respectively; and a pair of left and right sub slant frames 46, 47 (although only reference numeral 46 on the shown side is presented) connected to each intermediate portion of the slant frames 43, 44 and the front frame 33, respectively, so as to support a lower portion of the electrically-operated power steering apparatus 24.

FIG. 1 also shows a front carrier 55, a front fender 56 covering an upper side and a lower side of each front wheel 18, a fuel tank 57, a seat 58, a rear carrier 61, and a carburetor 62 connected to a rear side of a cylinder head 63 of an engine 12. An air cleaner 66 is connected to the carburetor 62 via a connecting tube 67. An exhaust pipe 68 extends rearward from a front portion of the cylinder head 63, and a muffler 69 connects to a rear end of the exhaust pipe 68.

A swing arm 71 supporting each rear wheel 23, 23 such that the rear wheel 23 is capable of swinging with respect to the lower main frames 34, 36. A pair of left and right rear cushion units 72, 72 (although only the one on the shown side is presented) are attached to extend between the swing arm 71 and the upper main frames 31, 32. A body side cover 73 disposed at a lateral side of the power unit 14, a rear fender 74 covering a front side and an upper side of each rear wheel 23, and a step floor 75.

Figure 2:
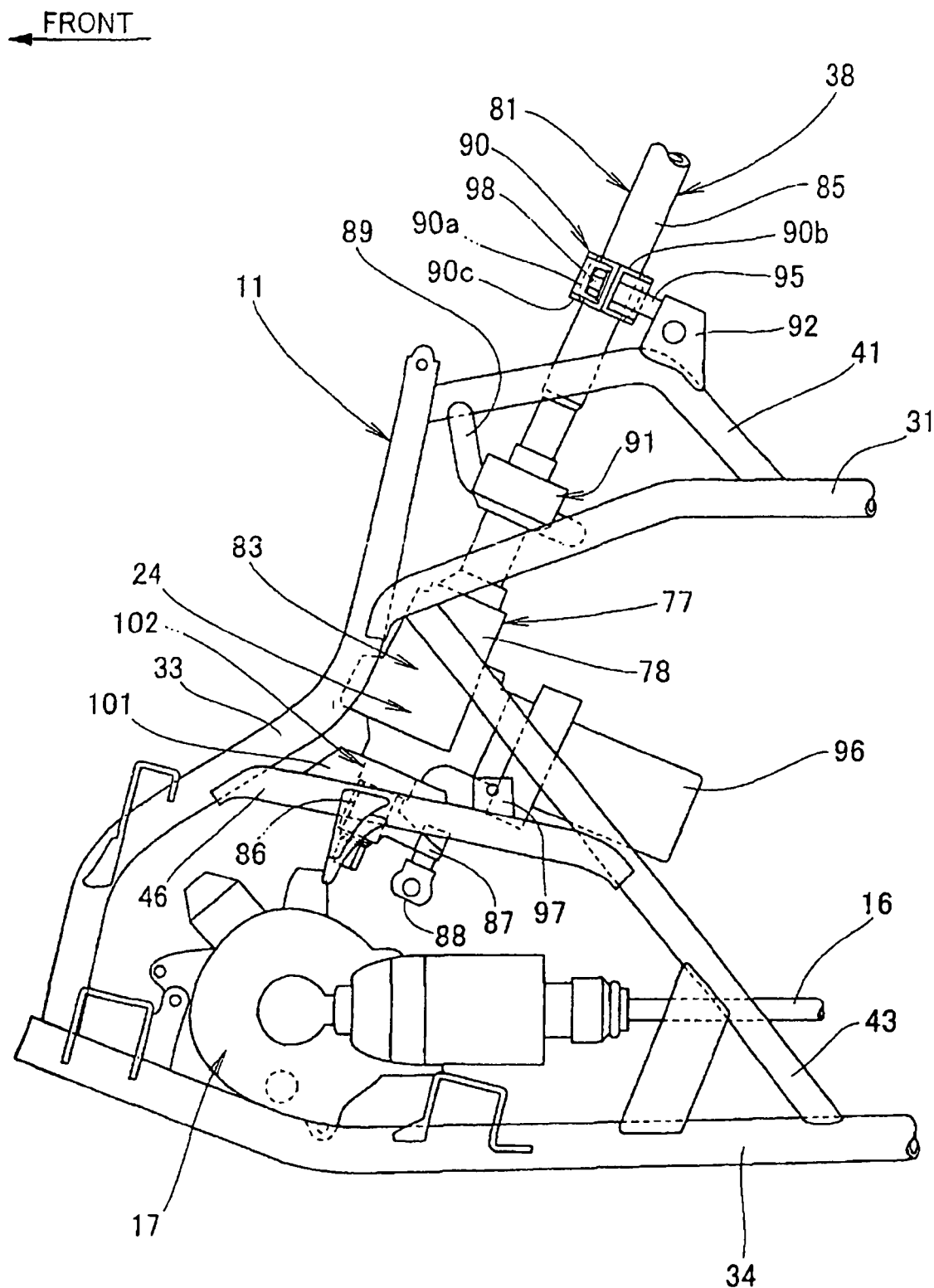
FIG. 2 is a side view of a principal portion of the all terrain vehicle according to the invention.

FIG. 2 is a side view of a principal portion of the all terrain vehicle according to the invention (in which arrow FRONT indicates a front side with respect to the vehicle, the same applies to all indications of direction in the following description). The electrically-operated power steering apparatus 24 includes a steering apparatus 81 for steering the front wheels, an actuator unit 77 disposed at a middle of the steering shaft 38 constituting the steering apparatus 81, and a control portion not shown. The actuator unit 77 includes an actuator housing 78 and a torque sensor portion (not shown) for detecting a steering torque and a power assist portion 83 for generating power for assisting the steering force, that are accommodated in the actuator housing 78. The control portion controls the power assist portion 83 based on the steering torque detected by the torque sensor portion, and others.

The steering apparatus 81 is constituted by the handlebars 37 (see FIG. 1), an input shaft 85 supporting the handlebars 37, an output shaft 86 connected to the input shaft 85 via the torque sensor portion, a steering arm 87 attached to a lower end portion of the output shaft 86, a pair of left and right ball joints 88, 88 (although only the one on the shown side is presented) attached to the steering arm 87, and a left and a right tie rod (not shown) each end of which is connected to each ball joint 88, 88 and each of the other end of which is connected to a knuckle (not shown). The input shaft 85 and the output shaft 86 are members constituting the steering shaft 38.

The input shaft 85 is a member supported at two places, namely, one side is supported by an upper bearing portion 90 and the other side is supported by an intermediate bearing portion 91.

The upper bearing portion 90 is attached with bolts 98, 98 to a support bracket 92 disposed across the left and right front upper frames 41, 42 (although only the one 41 on the shown side is presented) via two collars 95, 95. The upper bearing portion 90 is constituted by a radial bearing (slide bearing) 90a for rotatably supporting the input shaft 85, and a pair of bearing holding members 90b, 90c sandwiching and holding the radial bearing 90a.

The intermediate bearing portion 91 is supported by an intermediate bearing support bracket (not shown and described in detail later) attached to sub upper frames 89, 89 (although only the one on the shown side is presented).

The sub upper frames 89, 89 are members attached to respectively extend between the front upper frames 41, 42 and the upper main frames 31, 32 (although only the one 31 on the shown side is presented).

The output shaft 86 is supported by a lower bearing support bracket 101 attached to the left and right sub slant frames 46, 47 (although only the one 46 on the shown side is presented) via a lower bearing portion 102.

The torque sensor portion is provided with a torsion bar (not shown) disposed between the input shaft 85 and the output shaft 86.

When the input shaft 85 is rotated by an operation of the handlebars 37 (see FIG. 1), an angular strain occurs between the input shaft 85 and the output shaft 86, thereby twisting the torsion bar. This twisting is converted into a torque to obtain the steering torque.

The power assist portion 83 is constituted by an electric motor 96, a clutch (not shown) interposed between an output shaft of the electric motor 96 and the output shaft 86, and a reduction gear (not shown, constituted by a worm gear and a worm wheel).

The electric motor 96 is attached at its front end portion (on the side of the output shaft 86) to motor brackets 97, 97 (only the one on the shown side is presented) disposed on the sub slant frames 46, 47.

The control portion controls the power assist portion 83 based on the steering torque detected by the torque sensor portion, a steering angle detected by a steering angle sensor, vehicle speed of the all terrain vehicle 10 (see FIG. 1), and others.

The front final reduction gear 17 is located below the actuator unit 77. Hence, in the present invention, an overall length of the steering shaft 38 of the electrically-operated power steering apparatus 24 is reduced and the electrically-operated power steering apparatus 24 is disposed in a small space.

Figure 3:
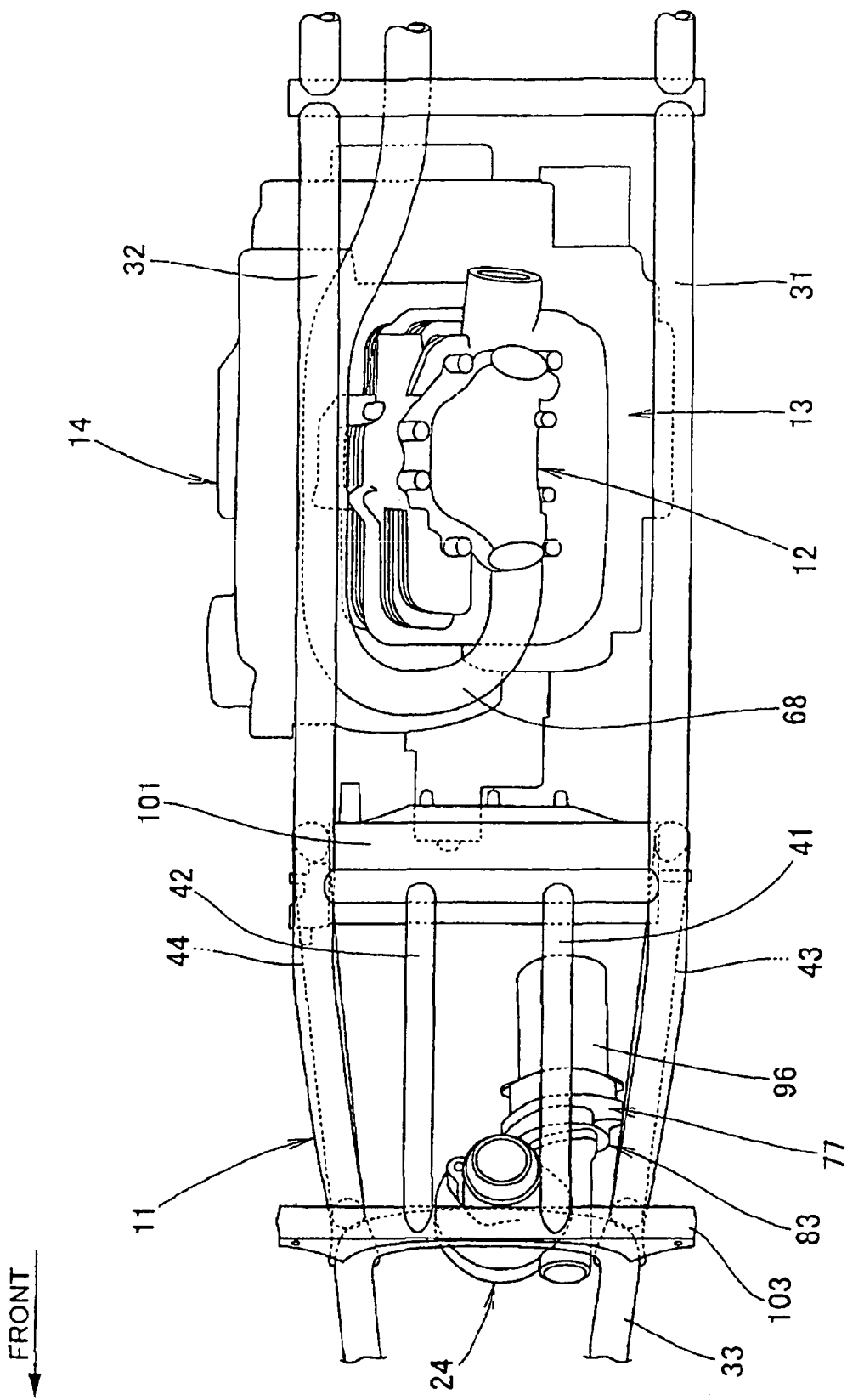
FIG. 3 is a plan view of the principal portion of the all terrain vehicle according to the invention.

FIG. 3 is a plan view of a principal portion of the all terrain vehicle according to the invention, showing that the electric motor 96 of the actuator unit 77 is disposed to extend in the longitudinal direction of the vehicle, and a forced air cooling fan 100 is disposed on the rear side of the electric motor 96 and on the front side of the engine 12 and the exhaust pipe 68. Reference numeral 103 denotes a cross member attached on an upper portion of the front frame 33 and extending in the transverse direction of the vehicle, in order to support upper ends of the left and right front cushion units for the front wheels 18, 18 (see FIG. 1).

The electric motor 96 is completely shielded from the engine 12 and the exhaust pipe 68 by the forced air cooling fan 100. Hence, even with the electric motor 96 disposed to extend rearward to making small the distance between the electric motor 96 and the engine 12 and the exhaust pipe 68, heat radiated from the engine 12 and the exhaust pipe 68 is not directly received by the electric motor 96.

Figure 4:
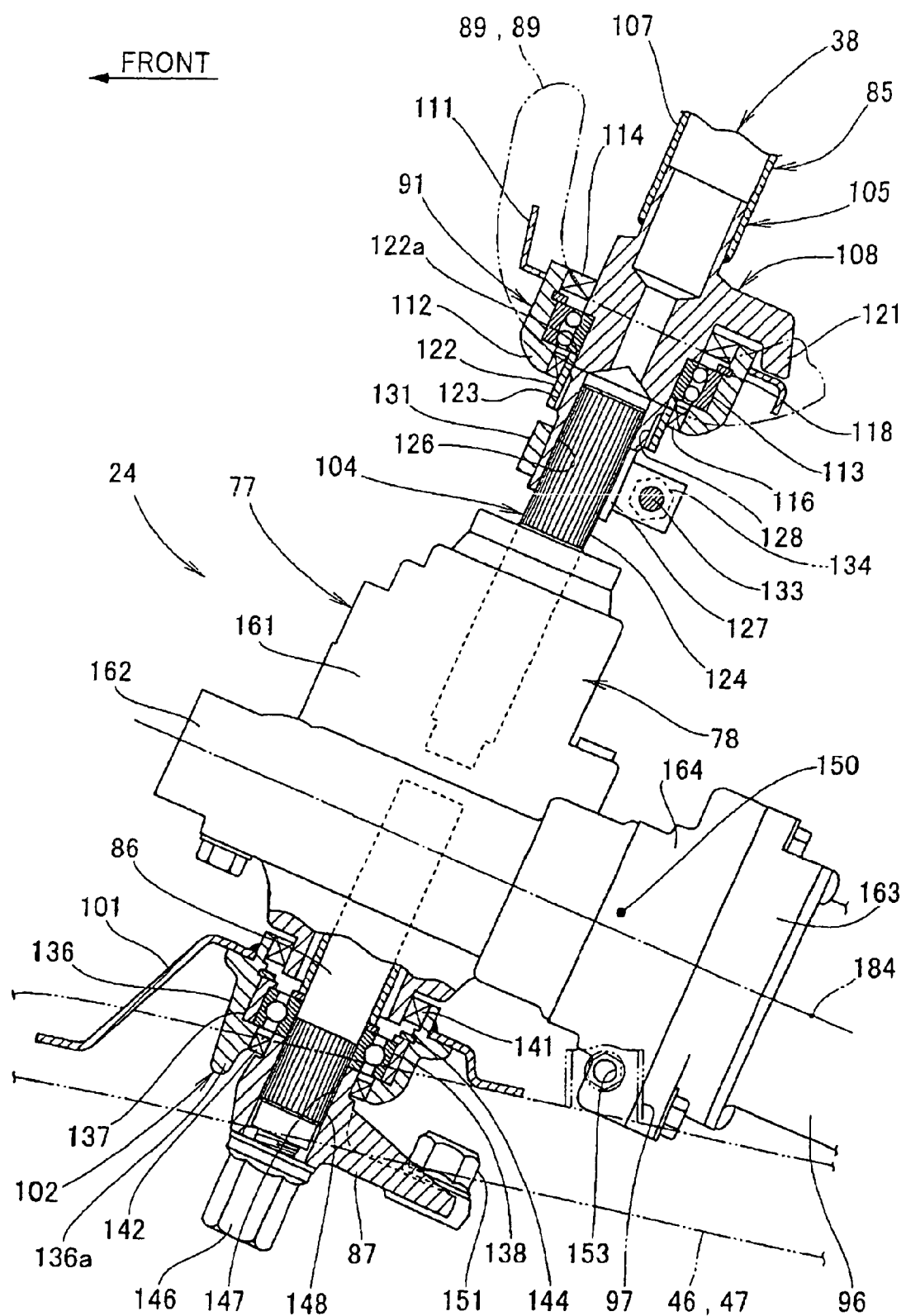
FIG. 4 is a cross-sectional view of a structure of supporting the electrically-operated power steering apparatus according to the invention.

FIG. 4 is a cross-sectional view (partially side view) showing a structure of supporting the electrically-operated power steering apparatus according to the invention. The input shaft 85 is constituted by a lower shaft 104 protruding from the actuator unit 77, and an upper shaft 105 supported by the intermediate bearing portion 91 and connected to the lower shaft 104. The upper shaft 105 is constituted by an upper pipe 107 supporting the handlebars, and a lower end connecting member 108 attached to a lower end portion of the upper pipe 107.

The intermediate bearing portion 91 is constituted by an upper bearing holder 112 removably attached with a bolt (not shown) to an intermediate bearing support bracket 111, a self-aligning ball bearing 113 attached to the upper bearing holder 112 to rotatably support the lower end connecting member 108, and seal members 114, 116 for protecting the ball bearing 113 against dust or the like. Reference numeral 118 denotes a stopper ring that inhibits the ball bearing 113 from getting out of the upper bearing holder 112.

The lower end connecting member 108 has a rearward protrusion 121 that is integrally formed in an upper portion of the lower end connecting member 108 to protrude rearward. In a lower portion of the lower end connecting member 108 are formed an external thread 123 in screwed engagement with a nut member 122, an internal serration 126 engaging an external serration 124 formed on an external circumferential surface of the lower shaft 104, and a slit 127 formed at an end of the lower end connecting member 108.

The rearward protrusion 121 is a portion to be brought into contact with a stopper (not shown) disposed on the upper bearing holder 112 when the lower end connecting member 108 is rotated by way of the handlebars. The rearward protrusion 121 limits a turn angle of the handlebars to a predetermined angle range.

An end 122a of the nut member 122 is pressed onto the ball bearing 113 by the internal thread 128 of the nut member 122 engaging with the external thread 123.

When an outer circumferential surface of the lower end connecting member 108 is tightened by a tightening member 131 with the lower shaft 104 and the lower end connecting member 108 engaged with each other by means of the serrations, the width of the slit 127 is decreased so that the tightening force effectively acts. Reference numerals 133, 134 respectively denote a bolt and a nut of the tightening member 131 that are for the tightening.

The lower bearing portion 102 is constituted by a lower bearing holder 136 attached at a central portion of the lower bearing support bracket 101 supported by the sub slant frames 46, 47, a ball bearing 138 attached to the lower bearing holder 136 via a collar 137 so as to rotatably support the output shaft 86, and seal members 141, 142 for protecting the ball bearing 138 from dust or the like. Reference numerals 144 denotes a stopper ring that inhibits the ball bearing 138 and collar 137 from getting out of the lower bearing holder 136.

The lower bearing holder 136 has a downward protrusion 136a that protrudes from a front portion of the lower bearing holder 136 downward and substantially along the output shaft 86. When the output shaft 86 is rotated by a specific angle by turning the handlebars, a sideward protrusion (not shown) formed in the steering arm 87 is brought into contact with the downward protrusion 136a, thereby delimiting a rotatable angle range of the output shaft 86. That is, the downward protrusion 136a serves as a stopper for delimiting the rotatable angle range of the output shaft 86.

The steering arm 87 is a member attached to an end portion of the output shaft 86 with a nut 146. An internal serration 147 formed in an internal circumferential surface of the steering arm 87 is engaged with an external serration 148 formed at the lower end portion of the output shaft 86. A ball joint (not shown) is attached to a nut portion 151 integrally formed in the steering arm 87, and the ball joint is connected to the front wheel with a tie rod (not shown). Reference numeral 153 denotes an internal thread into which a bolt (not shown) is screwed when the electric motor is attached to the motor bracket 97 with that bolt.

A black circle in FIG. 4 indicates a center of gravity 150 of the actuator unit 77, which center is located above and near the motor bracket 97. That is, by having the motor brackets 97, 97 (although only the one on the shown side is presented) located near the center of gravity 150 of the actuator unit 77, the weight of the actuator unit 77 is efficiently supported by the motor brackets 97, 97, thereby reducing a load from the actuator unit 77 as received by the intermediate bearing portion 91 and the lower bearing portion 102.

The actuator housing 78 includes a sensor housing 161 accommodating the torque sensor portion, a worm gear housing 162 accommodating the worm gear meshing with the worm wheel disposed on the output shaft 86, a motor housing 163 as a housing of the electric motor 96, and a joint housing 164 disposed on the side of the worm gear housing 162 in order to connect the motor housing 163 to the worm gear housing 162.

In a side surface of the joint housing 164 are formed the external threads 153, 153 (although only the one on the shown side is presented). The joint housing 164 accommodates a joint that connects the worm gear accommodated in the worm gear housing 162 and the rotational shaft of a mainbody of the motor accommodated in the motor housing 163.

Figure 5:
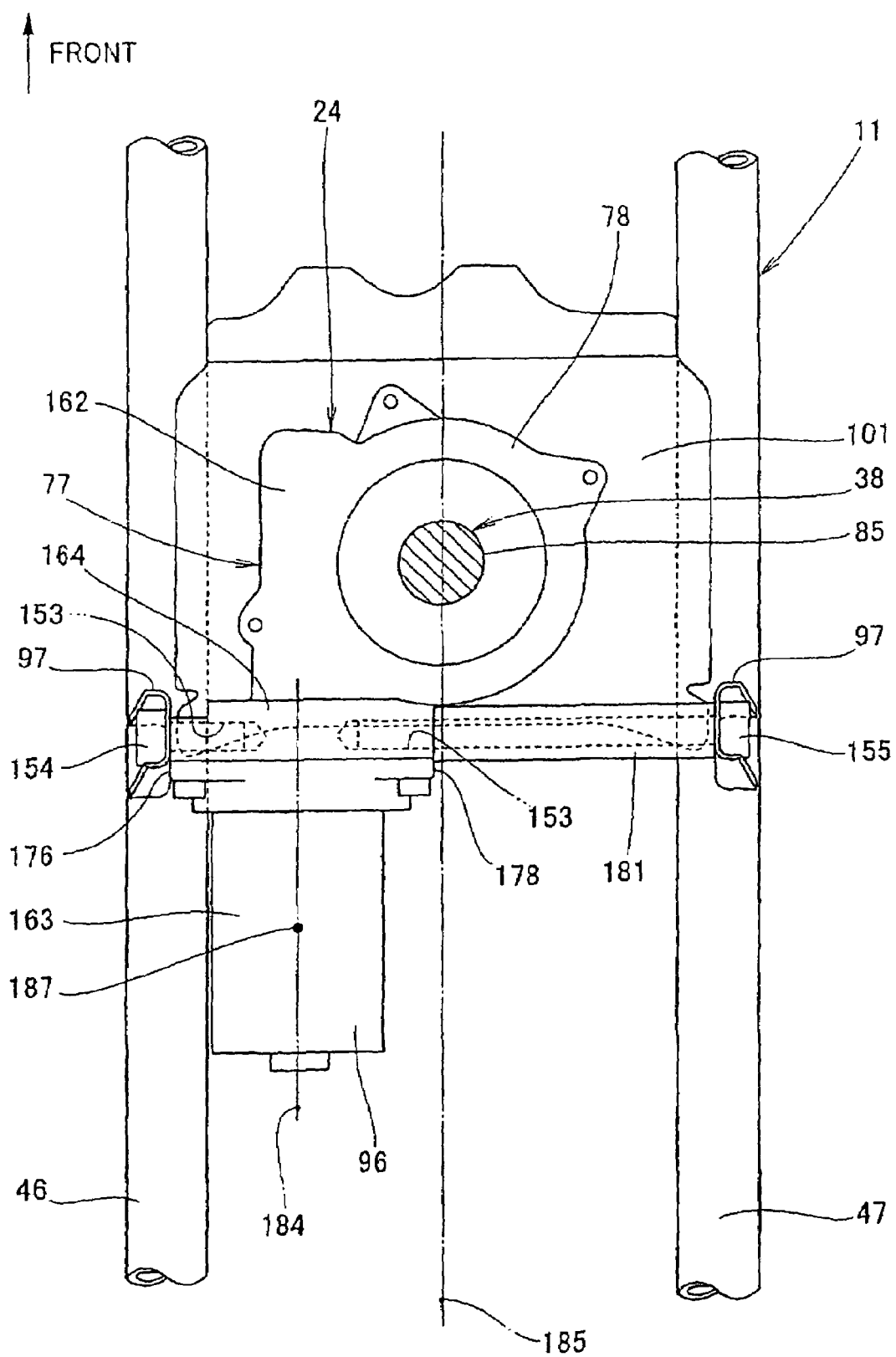
FIG. 5 is an explanatory view of the structure of supporting the electrically-operated power steering apparatus according to the invention.

FIG. 5 is an explanatory view showing a structure of supporting the electrically-operated power steering apparatus according to the invention, as seen from an axial direction of the input shaft 85.

The actuator unit 77 of the electrically-operated power steering apparatus 24 is attached such that the external thread 153 is formed in each of opposite side surfaces 176, 178 of the motor housing 163 of the electric motor 96, and bolts 154, 155 are respectively inserted into bolt holes (not shown) formed in the left and right motor brackets 97, 97, and then screwed into the internal threads 153, 153. Reference numeral 181 denotes a cylindrical collar member interposed between the right motor bracket 97 and the motor housing 163 to cover the bolt 155.

The actuator unit 77 is rotatably supported by the intermediate and lower bearing portions 91, 102 at its upper and lower portions, respectively, as shown in FIG. 4. Hence, in FIG. 5, the actuator unit 77 can freely swing around the steering shaft 38 while the electric motor 96 is not attached to the body frame 11. Thus, by attaching the electric motor 96 to the body frame 11 such that the swinging of the actuator unit 77 is stopped by the motor brackets 97, 97 having a surface substantially perpendicular to a direction of the swinging, the actuator unit 77 can be supported reasonably. Since the bolts 154, 155 extend substantially along a tangential line with respect to the swinging direction of the actuator unit 77, a rotational force generated when the actuator unit 77 is operated acts on the bolts 154, 155 as a force in a direction of tension or compression, the bolts 154, 155 can receive this force without troubles.

The electric motor 96 extends rearward from the worm gear housing 162, and an axis 184 of the rotational shaft of the electric motor 96 is parallel to a center line 185 of the vehicle extending in the longitudinal direction of the vehicle. A center of gravity 187 of the electric motor 96 is located on the axis 184. Since the electric motor 96 is a heavy load, when the center of gravity 187 of the electric motor 96 is away from the center line 185 of the vehicle, the center of gravity of the vehicle is deviated to the left from the transverse center. However, with a heavy load of a weight substantially equal to that of the electric motor 96 mounted to the right of the center line 185 of the vehicle, the center of gravity of the vehicle can be positioned substantially on the center line 185 of the vehicle.

As has been described above with reference to FIGS. 4 and 5, the invention provides a structure of attaching an electrically-operated power steering apparatus 24 for a vehicle, in which the steering shaft 38 is rotatably attached to the body frame 11, and the handlebars 37 is attached to the upper portion of the steering shaft 38 and the actuator unit 77 is disposed on the intermediate portion of the steering shaft 38, the structure being characterized first in that the body frame 11, more specifically, the sub slant frames 46, 47, have the respective motor brackets 97, 97 as a support member for supporting the actuator unit 77, the motor brackets 97, 97 have the bolts 154, 155, respectively, as fastening means that fastens the actuator unit 77, and the bolts 154, 155 extend perpendicularly to the steering shaft 38.

Even when the axis of the steering shaft 38 and accordingly the actuator unit 77 deviates in the transverse direction in assembling the steering shaft 38, the actuator unit 77 can be reliably supported by the body frame 11, without enhancing the dimensional accuracy of the body frame 11.

The structure according to the invention is characterized secondly in that the actuator unit 77 has, at positions corresponding to the motor brackets 97, 97, the internal threads 153, 153 as fastening holes engaging with the bolts 154, 155, and the bolts 154, 155 as the fastening means respectively extend through the motor brackets 97, 97 and the internal threads 153, 153 in the transverse direction of the vehicle.

The fastening means is provided in a simplified form, namely, the bolts 154, 155. However, since the direction in which the bolts 154, 155 are turned to be loosened and tightened and the rotational direction of the steering shaft 38 are different from each other, rotation of the steering shaft 38 does not exert a force in the turning direction of the bolts 154, 155. Hence, the bolts 154, 155 can be maintained tightly fastened.

The structure according to the invention is characterized thirdly in that the actuator unit 77 has, at positions corresponding to the motor brackets 97, 97, the internal threads 153, 153 engaging with the bolts 154, 155, and the internal threads 153, 153 are located near the center of gravity 150 of the actuator unit 77 in side view.

Since the internal threads 153, 153 are located substantially at the center of gravity 150 of the actuator unit 77 in side view, a force acting on the center of gravity 150 of the actuator unit 77 can be sufficiently received by the motor brackets 97, 97.

The structure according to the invention is characterized fourthly in that the actuator unit 77 has the motor housing 163 covering the electric motor 96, the worm gear housing 162 covering the worm gear that transmits rotation of the electric motor 96 to the steering shaft 38, and the joint housing 164 connecting the motor housing 163 with the worm gear housing 162, and the internal threads 153, 153 are formed in the joint housing 164.

With the joint housing 164 supporting the electric motor 96 as a heavy load, the electric motor 96 is inhibited from rotating around the steering shaft 38 with rotation of the steering shaft 38. The joint housing 164 is a portion connecting the motor housing 163 with the worm gear housing 162, and thus inside the joint housing 164 extends only the joint as a connecting member for connecting the rotational shaft of the mainbody of the electric motor 96 and the worm gear. Hence, a wall in which the internal threads 153 are formed can be easily provided in the joint housing 164.

The structure according to the invention is characterized fifthly in that a portion of the actuator unit 77 below the steering shaft 38 is supported by the body frame 11, and has the lower bearing holder 136 as a bearing support member that rotatably supports the steering shaft 38, and the lower bearing holder 136 and the motor brackets 97, 97 are disposed on the sub slant frames 46, 47 as the same part that constitutes the body frame 11.

On the same sub slant frames 46, 47 are disposed the lower bearing holder 136 via the lower bearing support bracket 101, and the motor brackets 97, 97 directly. This enhances the assembly accuracy among a plurality of support members 136, 97, 97 supporting the actuator unit 77.

Although in the present embodiment the left and right motor brackets 97, 97 are disposed on the body frame 11, as shown in FIG. 5, the invention is not limited thereto, but may be embodied such that only the motor bracket 97 closer to the electric motor 96 is disposed.

The structure of attaching an electrically-operated power steering apparatus according to the invention is suitable for an all terrain vehicle.

What is claimed is:

1. A structure for attaching an electrically-operated power steering apparatus for a vehicle, in which a steering shaft is rotatably attached to a body frame, and handlebars are attached to an upper portion of the steering shaft and an actuator unit is disposed on an intermediate portion of the steering shaft, wherein the body frame has a support member which supports the actuator unit and has a bolt for fastening the actuator unit; and the bolt extends perpendicularly to the steering shaft, wherein the actuator unit includes a motor housing covering an electric motor, a worm gear housing covering a worm gear that transmits rotation of the electric motor to the steering shaft, and a joint housing connecting the motor housing with the worm gear housing, and wherein a fastening hole is formed in the joint housing.

2. The structure for attaching the electrically-operated power steering apparatus for the vehicle according to claim 1, wherein the fastening hole engages with the bolt at a position corresponding to the support member, and the bolt extends through the support member and the fastening hole in a transverse direction of the vehicle.

3. The structure for attaching the electrically-operated power steering apparatus for the vehicle according to claim 2, wherein a portion of the steering shaft below the actuator unit is supported by the body frame, and has a bearing support member that rotatably supports the steering shaft, the bearing support member and the support member being disposed on the same part that constitutes the body frame.

4. The structure for attaching the electrically-operated power steering apparatus for the vehicle according to claim 1, wherein the fastening hole engages with the bolt at a position corresponding to the support member, and the fastening hole is located substantially at a center of gravity of the actuator unit in side view.

5. The structure for attaching the electrically-operated power steering apparatus for the vehicle according to claim 4, wherein a portion of the steering shaft below the actuator unit is supported by the body frame, and has a bearing support member that rotatably supports the steering shaft, the bearing support member and the support member being disposed on the same part that constitutes the body frame.

6. The structure for attaching the electrically-operated power steering apparatus for the vehicle according to claim 1, wherein a portion of the steering shaft below the actuator unit is supported by the body frame, and has a bearing support member that rotatably supports the steering shaft, the bearing support member and the support member being disposed on the same part that constitutes the body frame.

7. The structure of attaching the electrically-operated power steering apparatus for the vehicle according to claim 1, wherein the support member is a pair of support members disposed respectively on upper sides of a pair of slant frames.

8. The structure of attaching the electrically-operated power steering apparatus for the vehicle according to claim 1, wherein the bolt extends along a tangential line with a swinging direction of the actuator unit, whereby a rotational force generated when the actuator unit is operated acts on the bolt as a force in a direction of tension or compression.

9. The structure of attaching the electrically-operated power steering apparatus for the vehicle according to claim 1, wherein the bolt is coaxially arranged with a second bolt to define a pair of bolts.

10. A structure for attaching an electrically-operated power steering apparatus for a vehicle, in which a steering shaft is rotatably attached to a body frame, and handlebars are attached to an upper portion of the steering shaft and an actuator unit is disposed on an intermediate portion of the steering shaft, wherein the body frame has a support member which supports the actuator unit and has a bolt for fastening the actuator unit; and the bolt extends perpendicularly to the steering shaft, wherein a cylindrical collar member covers at least a portion of the bolt, wherein the bolt is coaxially arranged with a second bolt to define a pair of bolts.

11. The structure for attaching the electrically-operated power steering apparatus for the vehicle according to claim 10, wherein the actuator unit includes a fastening hole engaging with the bolt at a position corresponding to the support member, and the bolt extends through the support member and the fastening hole in a transverse direction of the vehicle.

12. The structure for attaching the electrically-operated power steering apparatus for the vehicle according to claim 11, wherein the actuator unit includes a motor housing covering an electric motor, a worm gear housing covering a worm gear that transmits rotation of the electric motor to the steering shaft, and a joint housing connecting the motor housing with the worm gear housing, and wherein the fastening hole is formed in the joint housing.

13. The structure of attaching the electrically-operated power steering apparatus for the vehicle according to claim 12, wherein a portion of the steering shaft below the actuator unit is supported by the body frame, and has a bearing support member that rotatably supports the steering shaft, the bearing support member and the support member being disposed on the same part that constitutes the body frame.

14. The structure for attaching the electrically-operated power steering apparatus for the vehicle according to claim 11, wherein a portion of the steering shaft below the actuator unit is supported by the body frame, and has a bearing support member that rotatably supports the steering shaft, the bearing support member and the support member being disposed on the same part that constitutes the body frame.

15. The structure for attaching the electrically-operated power steering apparatus for the vehicle according to claim 10, wherein the actuator unit includes a fastening hole engaging with the bolt at a position corresponding to the support member, and the fastening hole is located substantially at a center of gravity of the actuator unit in side view.

16. The structure for attaching the electrically-operated power steering apparatus for the vehicle according to claim 15, wherein a portion of the steering shaft below the actuator unit is supported by the body frame, and has a bearing support member that rotatably supports the steering shaft, the bearing support member and the support member being disposed on the same part that constitutes the body frame.

17. The structure for attaching the electrically-operated power steering apparatus for the vehicle according to claim 10, wherein a portion of the steering shaft below the actuator unit is supported by the body frame, and has a bearing support member that rotatably supports the steering shaft, the bearing support member and the support member being disposed on the same part that constitutes the body frame.

18. A structure for attaching an electrically-operated power steering apparatus for a vehicle, in which a steering shaft is rotatably attached to a body frame, and handlebars are attached to an upper portion of the steering shaft and an actuator unit is disposed on an intermediate portion of the steering shaft, wherein the body frame has a support member which supports the actuator unit and has a bolt for fastening the actuator unit; and the bolt extends perpendicularly to the steering shaft, wherein a cylindrical collar member covers at least a portion of the bolt, wherein an electric motor of the steering apparatus is arranged so that an axis of a rotational shaft of the electric motor is substantially perpendicular to an axis of the steering shaft, and a vertical plane including the axis of the rotational shaft of the electric motor is parallel to and offset from a vertical plane including a center line of the vehicle extending in a longitudinal direction of the vehicle.

\* \* \* \* \*